S. BARTON.
ICE CYCLE.
APPLICATION FILED MAY 8, 1916.
1,261,204.
Patented Apr. 2, 1918.
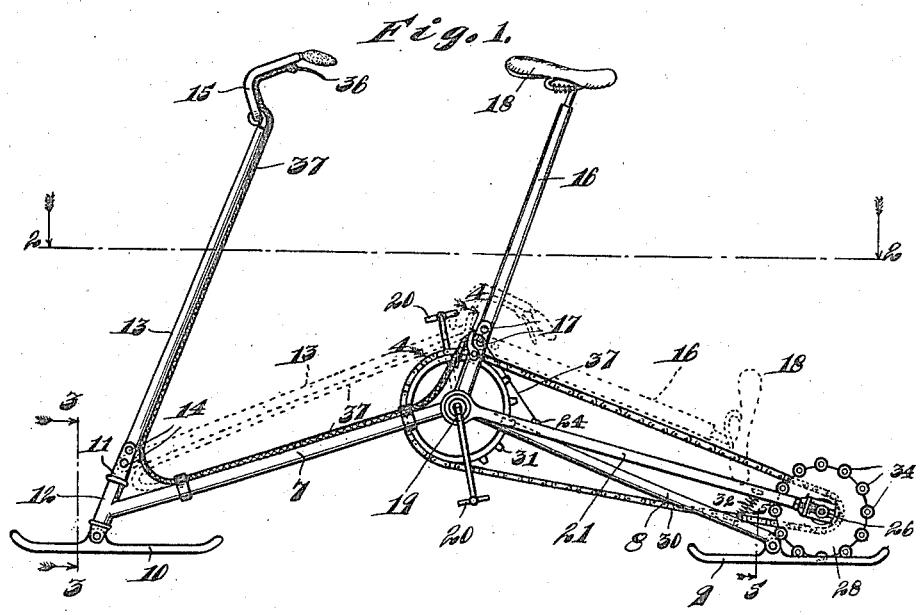
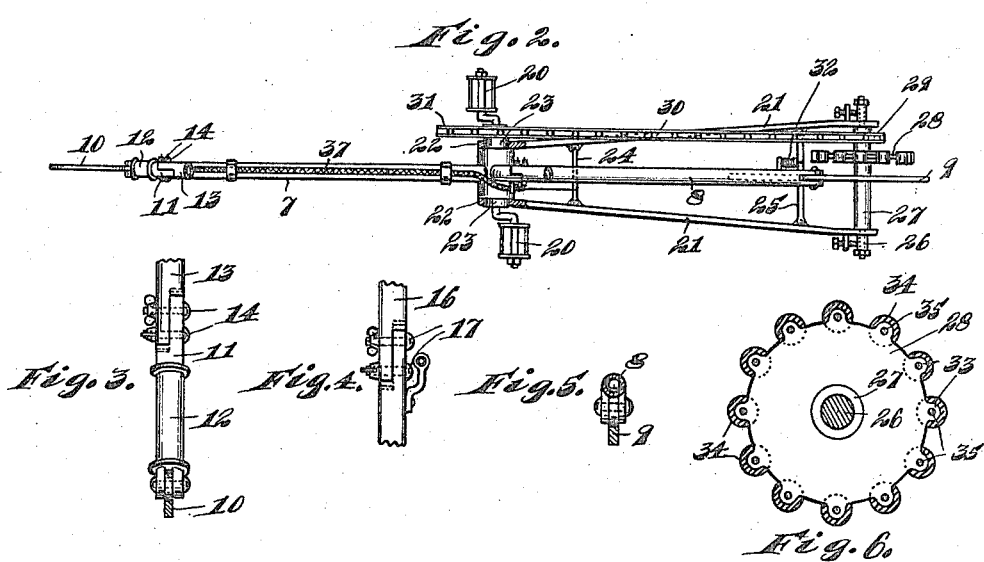

UNITED STATES PATENT OFFICE.

SAMUEL BARTON, OF BROOKLYN, NEW YORK.

ICE-CYCLE.

1,261,204. Specification of Letters Patent. Patented Apr. 2, 1918.

Application filed May 8, 1916. Serial No. 96,031.

*To all whom it may concern:*

Be it known that I, SAMUEL BARTON, a citizen of the United States, and a resident of the city of Brooklyn, county of Kings, and State of New York, have invented certain new and useful Improvements in Ice-Cycles, of which the following is a specification.

My invention relates to improvements in ice cycles, and has for its object the provision of a device of this character especially adapted to run upon ice and with improved and novel driving means.

The invention consists in the combinations and arrangements of parts hereinafter described and claimed.

The invention will be best understood by reference to the accompanying drawings forming a part of this specification, and in which, Figure 1 is a side view of a construction embodying my invention, Fig. 2, a horizontal section taken substantially on line 2—2 of Fig. 1, Fig. 3, an enlarged section taken on line 3—3 of Fig. 1, Fig. 4, an enlarged section taken on line 4—4 of Fig. 1, Fig. 5, an enlarged section taken on line 5—5 of Fig. 1, and Fig. 6, an enlarged detail view of a driving wheel employed in the construction.

The preferred form of construction, as illustrated in the drawings, comprises a suitable frame made up of a forwardly extending tubular member 7 and a rearwardly extending tubular member 8. A runner 9 is mounted at the rear of said frame and a runner 10 at the front thereof in longitudinal alinement with runner 9. The runner 10 is mounted, as indicated, at the lower end of a steering shaft 11 rotatably mounted in a bearing 12 at the front of frame arm 7, said steering shaft being provided with an upwardly extending extension 13 connected thereto by means of bolts 14, as indicated in Fig. 3, the arrangement being such that by removing one of the bolts 14, the upper portion 13 of the steering shaft may be folded downwardly onto the frame of the device, as indicated in dotted lines in Fig. 1. At its upper end, steering shaft 13 carries an ordinary handle bar 15 for steering the device. A seat post 16 is also foldably connected with the frame of the machine by means of bolts 17, so that by the removal of one of said bolts 17, the seat post 16 may be folded down onto the frame of the machine, as indicated in dotted lines in Fig. 1. The seat post 16 is provided with a seat 18 of any usual or desired construction.

A crank shaft 19 is rotatably mounted centrally in the frame of the machine and provided with suitable pedals 20 for operating the same. A driving frame, consisting of side bars 21, is mounted to swing coaxially with the axis of crank shaft 19, said side bars being provided with bearing hubs 22 engaging over bearings 23 formed at the ends of the bearing for the crank shaft and being detachably secured together by means of cross bars 24 and 25, as indicated. A shaft 26 is adjustably secured at the rear end of the arms 21 and is provided with a sleeve 27 loosely mounted thereon. A driving wheel 28 is fixed to sleeve 27 which also carries a sprocket 29 connected by a sprocket chain 30 with a sprocket 31 on the crank shaft 19, whereby said driving wheel is rotated by the action of said crank shaft. The driving frame is normally held in depressed position by means of a spring 32 secured thereto and to the frame bar 8 so as to effect contact of said driving wheel with the ice or other bearing surface. The contact wheel 28 is provided, on its periphery, with a plurality of radially extending lugs 33, and bearing disks 34 of fiber composition are recessed to fit over said lugs and are secured in place by means of bolts 35, as best indicated in Fig. 6, said fiber disks contacting with the ice or other surface, as will be readily understood. By this arrangement, it will be observed that by operating crank shaft 19 in the usual manner, the device will be driven over the ice, as desired.

An operating lever 36 is mounted upon the handle bar 15 and is connected by an ordinary Bowden wire 37 with the driving frame 21, whereby said driving frame and driving wheel 28 may be elevated from contact with the ice, when desired.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having described my invention what I claim as new and desire to secure by Letters Patent is:

A device of the class described comprising a frame mounted upon runners; a pedal-driven sprocket on said frame; a swinging frame mounted to swing co-axially with said sprocket; a toothed driving wheel mounted in the free end of said swinging frame and arranged to engage the traction surface; a sprocket attached to said driving wheel; a sprocket chain connecting said sprockets; a spring normally depressing said swinging frame to hold said driving wheel in engagement with the traction surface; a foldable steering post for said frame; a foldable seat post for said frame; an operating lever on said steering post; and a Bowden wire connecting said lever with said swinging frame, substantially as described.

In testimony whereof I have signed my name to this specification in the presence of two subscribing witnesses.

SAMUEL BARTON.

Witnesses:
JOSHUA R. H. POTTS,
HELEN F. LILLIS.

Copies of this patent may be obtained for five cents each, by addressing the "Commissioner of Patents, Washington, D. C."